United States Patent
Ma et al.

(10) Patent No.: US 9,001,127 B2
(45) Date of Patent: Apr. 7, 2015

(54) METHOD AND DEVICE FOR PROCESSING VECTOR GRAPHICS

(75) Inventors: Chenguang Ma, Zhuhai (CN); Yunbo Bai, Zhuhai (CN)

(73) Assignee: Actions Semiconductor Co., Ltd., Zhuhai (CN)

( * ) Notice: Subject to any disclaimer, the term of this patent is extended or adjusted under 35 U.S.C. 154(b) by 867 days.

(21) Appl. No.: 13/254,399

(22) PCT Filed: May 31, 2010

(86) PCT No.: PCT/CN2010/073376
§ 371 (c)(1),
(2), (4) Date: Sep. 1, 2011

(87) PCT Pub. No.: WO2010/142208
PCT Pub. Date: Dec. 16, 2010

(65) Prior Publication Data
US 2011/0316875 A1    Dec. 29, 2011

(30) Foreign Application Priority Data
Jun. 10, 2009  (CN) .......................... 2009 1 0203728

(51) Int. Cl.
*G06T 11/20*  (2006.01)
*G06T 11/40*  (2006.01)

(52) U.S. Cl.
CPC ............... *G06T 11/203* (2013.01); *G06T 11/40* (2013.01)

(58) Field of Classification Search
CPC   G06T 11/203; G06T 7/0093; G06K 9/00617; G06K 9/34
USPC ........................................................ 345/441
See application file for complete search history.

(56) References Cited

U.S. PATENT DOCUMENTS 5,519,823 A    5/1996  Barkans et al.

FOREIGN PATENT DOCUMENTS

| CN | 101046888 | 10/2007 |
|---|---|---|
| CN | 101211416 | 7/2008 |

OTHER PUBLICATIONS

International Search Report for PCT/CN2010/073376 dated Sep. 9, 2010.

*Primary Examiner* — Devona Faulk
*Assistant Examiner* — Wynton S Jones
(74) *Attorney, Agent, or Firm* — Foley & Lardner LLP; James F. Ewing; Paul M. H. Pua

(57) ABSTRACT

A method and a device for reducing the waste of the central process unit (CPU) resource during the filling process of a vector graphic, and the method includes: parsing the vector graphic to obtain a series of polygons; mapping the polygons into a new drawing coordinate whose unit is 1/2" pixel using a transform parameter and a transform matrix, while updating an original drawing window into the new drawing coordinate at the same time, wherein the transform parameter is A, $A=2^n/K$, n is a shift parameter, the unit of the vertex coordinate of the polygon is 1/K pixel, and n, K are valued for natural numbers; obtaining the portions of the polygons located in the new drawing window in the new drawing coordinate; transforming the portions of the polygons located in the new drawing window in the new drawing coordinate into a group of scan segments; and shifting the original code of the coordinate of the scan segments to right by n bit, and rendering the pixels of the shifted scan segments. In the embodiment of the present invention, when the pixels covered by the scanning line are rendered, and the division operations are replaced with the manner of shifting the coordinate values, and the generated polygon cutting error is transferred to the calculating process before the rendering, the division operation is reduced in the precondition of ensuring the result is correct, so that the occupation of the CPU resource is reduced.

19 Claims, 4 Drawing Sheets

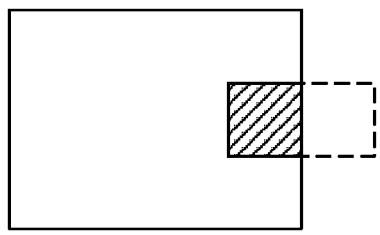
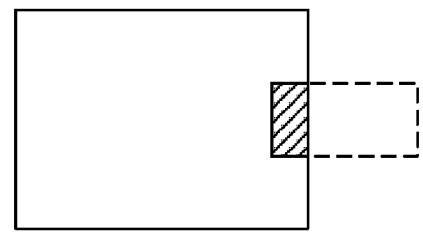
Fig.4a  Fig.4b
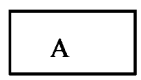
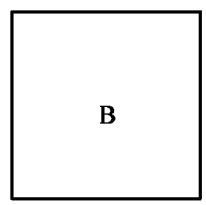
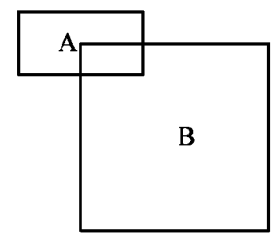
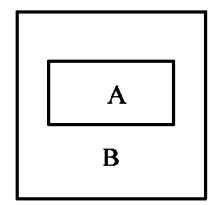
Fig.5a  Fig.5b  Fig.5c
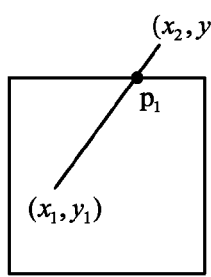
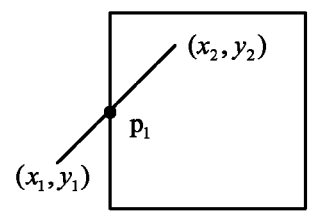
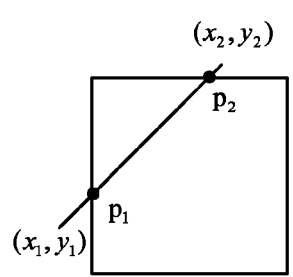
Fig.6a  Fig.6b  Fig.6c

METHOD AND DEVICE FOR PROCESSING VECTOR GRAPHICS

CROSS REFERENCE TO RELATED APPLICATIONS

The present application is a US National Stage of PCT International Application No. PCT/CN2010/073376, filed 31 May 2010, designating the United States, and claiming priority to Chinese Patent Application No. 200910203728.3, filed 10 Jun. 2009. The foregoing applications are hereby incorporated herein by reference in their entireties.

FIELD OF THE INVENTION

The present invention relates to the field of processing multimedia data and particularly to a method and device for reducing a CPU resource consumed by filling a vector graph.

BACKGROUND OF THE INVENTION

A vector graph is a geometrical graph described by a series of coordinate points and having a specific shape and attribute. FLASH, which is an animation format of a vector graph, defines the graph primarily as a line and area. Particularly, the line depicts a contour of a shape of the graph, and the area refers to an enclosed scope defined in the contour of the shape. Drawing of a FLASH vector graph primarily involves filling of the area. In FLASH, an area is defined by various interlaced colors, and lines defining the contour of the area include straight lines and curves. For a uniform filling algorithm, the area has to be segmented into a series of monochromatic polygons prior to being filled and is filled by filling the polygons.

Filling of a polygon is a computation-intensive process, each operation of which requires a considerable computation resource, thus requiring a great processing capacity of a Central Processing Unit (CPU). The process includes coordinate transformation of vertexes of the polygon, tailoring of the polygon with respect to a drawing window, conversion of the polygon into scan lines in the drawing window and coloring of the scan lines.

Referring to FIG. 1, a specific flow of filling a polygon in the prior art is as follows.

Operation 101: a vector graph is parsed into a series of polygons.

Operation 102: vertex coordinates of each polygon are transformed through a matrix operation, to map the polygon into a drawing window, where vertex coordinates of the polygon are in 1/20 pixel.

Operation 103: the polygon is tailored with respect to the drawing window into a polygon in the drawing window.

Operation 104: a scan conversion algorithm is applied to convert the polygon in the drawing window into a set of scan lines in the drawing window.

Operation 105: pixels covered by each scan line are colored, where coordinates of intersections of the scan lines are divided by 20 into coordinate values in pixel in the drawing window during coloring.

In the foregoing filling process, vertex coordinates of a polygon are in 1/20 pixel, all operations, before the operation 105 of coloring pixels covered by each scan line, have to be performed with a coordinate in 1/20 pixel, and then during coloring of the pixels, the coordinates of the intersections of the converted scan lines are divided by 20 into coordinate values in pixel in the drawing window. The division operation performed by a CPU is very time-consuming and consumes a considerable CPU resource, thus requiring a great processing capacity of the CPU.

SUMMARY OF THE INVENTION

The invention provides a method and device for processing a vector graph to reduce a CPU resource consumed by filling the vector graph.

An embodiment of the invention provides a method for processing a vector graph, which includes:

parsing the vector graph into a series of polygons;

mapping the polygons into a new drawing coordinate system in $1/2^n$ pixel by using a transformation parameter and a transformation matrix, and updating an original drawing window into the new drawing coordinate system, where the transformation parameter is represented by A and $A=2^n/K$, where n is a shift parameter, vertex coordinates of each polygon are in 1/K pixel, and n and K are natural numbers;

acquiring, in a new drawing window, a part of each polygon in the new drawing coordinate system;

converting the part of the polygon in the new drawing coordinate system in the new drawing window into a set of scan segments; and shifting true forms of coordinates of the scan segments by n bits to the right, and coloring pixels on shifted scan segments.

An embodiment of the invention provides a device for processing a vector graph, which includes:

a parsing unit configured to parse the vector graph into a series of polygons;

a mapping unit configured to map the polygons into a new drawing coordinate system in $1/2^n$ pixel by using a transformation matrix multiplied by a transformation parameter, and to update an original drawing window into the new drawing coordinate system where the transformation parameter is represented by A and $A=2^n/K$, where n is a shift parameter, vertex coordinates of each polygon are in 1/K pixel, and n and K are natural numbers;

a polygon acquiring unit configured to acquire, in a new drawing window, a part of each polygon in the new drawing coordinate system;

a scan converting unit configured to convert the part of the polygon in the new drawing coordinate system in the new drawing window into a set of scan segments;

a shifting unit configured to shifting true forms of coordinates of the scan segments by n bits to the right; and a pixel coloring unit configured to color pixels on shifted scan segments.

In the embodiments of the invention, when pixels covered by a scan line are being colored, a division operation is replaced with shifting of coordinate values, and a resulting error of tailoring a polygon is taken into consideration in an operation prior to coloring, thereby the number of division operations is reduced on the precondition of ensuring a correct result, thus the purpose of reducing a consumed CPU resource is finally achieved.

BRIEF DESCRIPTION OF THE DRAWINGS

FIGS. 4a and 4b illustrate schematic diagrams of a tailor error according to an embodiment of the invention;

FIGS. 5a, 5b and 5c illustrate schematic diagrams of a positional relationship between an encircling rectangle and a new drawing window according to an embodiment of the invention;

FIGS. 6a, 6b and 6c illustrate schematic diagrams of tailoring a polygon according to an embodiment of the invention;

DETAILED DESCRIPTION OF THE EMBODIMENTS

In a flow of processing a vector graph according to an embodiment of the invention, firstly the vector graph is parsed into a series of polygons, and then each polygon is mapped into a new drawing coordinate system in $1/2^n$ pixel by a transformation parameter and a transformation matrix, and an original drawing window is updated into the new drawing coordinate system; a part of each polygon in the new drawing coordinate system are acquired in a new drawing window; the part of the polygon in the new drawing coordinate system in the new drawing window is converted into a set of scan segments; and true forms of coordinates of the scan segments are shifted by n bits to the right, and pixels on shifted scan segments are colored, where the transformation parameter is represented by A, and $A=2^n/K$, where, n is a shift parameter, vertex coordinates of a polygon are in 1/K pixel, and n and K are natural numbers.

When coloring pixels covered by a scan line in the prior art, start-stop coordinates of a scan segment and a y coordinate of the scan line have to be divided by 20 into values in pixel, thus a large number of division operations is required. Embodiments of the invention will be described below taking K=20 as an example, but those skilled in the art may readily appreciate that the embodiments of the invention may equally be applicable when K is token any other natural number.

In an embodiment of the invention, in order to reduce the number of division operations, the division operations may be replaced with a shift operation, e.g., an operation of dividing by 20 may be replaced with an operation of dividing by a number which is approximate to 20 and is an integer power of 2, so that the division operation can be replaced with a simple integer shift operation. Furthermore, a resulting error of tailoring a polygon may be taken into consideration in a calculation process prior to coloring, to thereby eliminate an error in a final result.

The number which is approximate to 20 and is an integer power of 2 may be 8, 16, 32, 64, etc., and of course may be any other number, and when 20 is replaced with any one of these numbers, a corresponding calculation result prior to coloring of pixels covered by a scan line need to be multiplied by 0.4, 0.8, 1.6, 3.2, etc., to ensure a correct final calculation result.

For saving cost, a processor of a Reduced Instruction Set Computer (RISC), for example, is typically provided without any floating point processing unit, and a floating point operation may be performed on such a processor either through a software simulation or a fixed point approximation, the latter of which runs faster than the former in an allowable precision error range. Therefore in an embodiment of the invention, a part of the process involving a floating point operation may be performed through a fixed point approximation by replacing a decimal number with a fixed point number.

Figure 1:
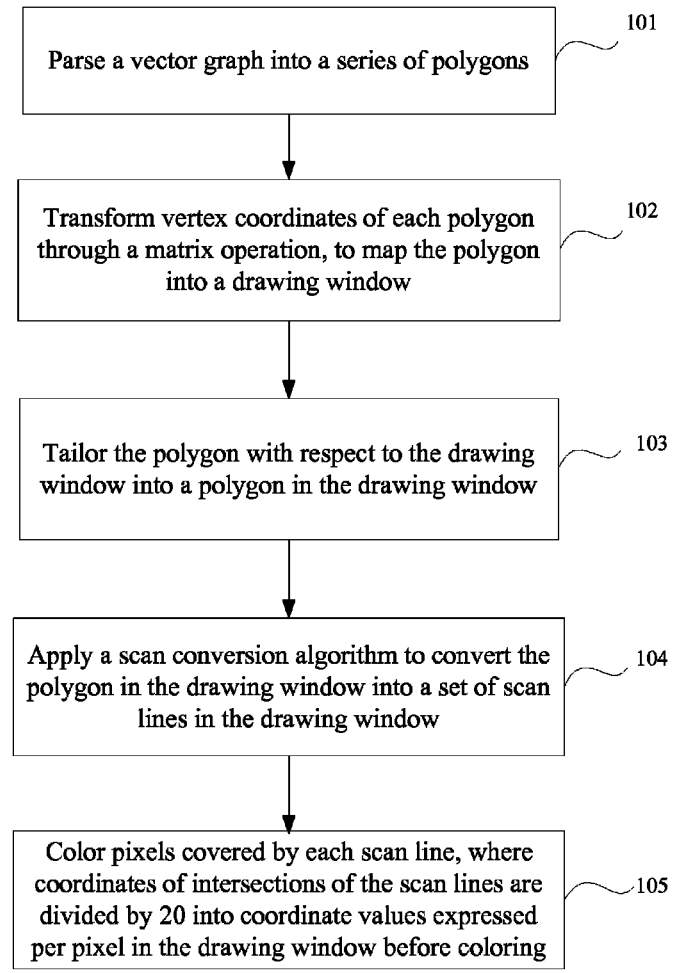
FIG. 1 illustrates a schematic diagram of a flow chart of a method for filling a vector graph in the prior art.
Figure 2:
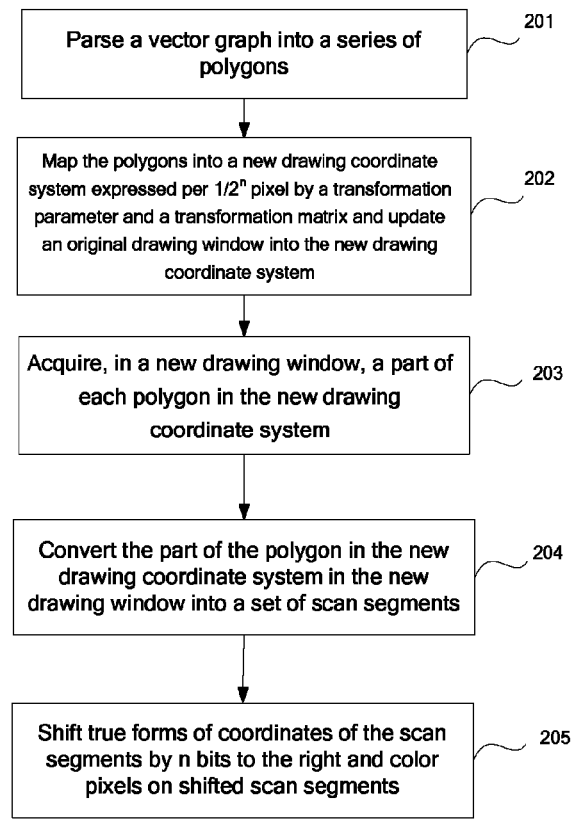
FIG. 2 illustrates a schematic diagram of a flow chart of a method for filling a vector graph according to an embodiment of the invention.

FIG. 2 illustrates a flow of implementing a method for filling a vector graph on a portable multimedia device according to an embodiment of the invention to reduce a consumed CPU resource in the portable multimedia device. The method is specified as follows.

Operation 201: the vector graph is parsed into a series of polygons. Here, coordinates of the polygons obtained through parsing are in 1/20 pixel because vertex coordinates of each polygon in a vector graph file are in 1/20 pixel.

Operation 202: each of the polygons is mapped into a new drawing coordinate system in $1/2^n$ pixel by a transformation parameter and a transformation matrix, and an original drawing window is updated into the new drawing coordinate system, where the transformation parameter is represented by A and $A=2^n K$, where n is a shift parameter, vertex coordinates of a polygon are in 1/20 pixel, and n is a natural number.

Operation 203: a part of each polygon in the new drawing coordinate system is acquired in a new drawing window.

Operation 204: the part of the polygon in the new drawing coordinate system in the new drawing window are converted into a set of scan segments.

Operation 205: true forms of coordinates of the scan segments are shifted by n bits to the right, and pixels on shifted scan segments are colored.

The operation 202 will be detailed below.

In a FLASH vector graph, a coordinate of a vertex of a polygon is defined in a form of a 32-bit integer, and a twiddle factor and a scale factor of the transformation matrix are defined in a form of a 16.16 fixed point number and a shift factor of the transformation matrix is defined in a form of a 32-bit integer.

In an embodiment of the invention, the transformation matrix for a coordinate is represented by T, and $$T = \begin{bmatrix} S_x & R_y & T_x \\ R_x & S_y & T_y \\ 0 & 0 & 1 \end{bmatrix}$$

Where $S_x$ is a scale factor in the direction x, $S_y$ is a scale factor in the direction y, $R_x$ is a twiddle factor in the direction x, $R_y$ is a twiddle factor in the direction y, $T_x$ is a shift factor in the direction x, and $T_y$ is a shift factor in the direction y. A transformation process is as follows:

$$\begin{bmatrix} x' \\ y' \\ 1 \end{bmatrix} = T \begin{bmatrix} x \\ y \\ 1 \end{bmatrix}$$

After being developed:

$$x' = S_x x + R_y y + T_x,$$

$$y' = R_x x + S_y y + T_y,$$

Where (x, y) is an original coordinate, and (x',y') is a transformed coordinate.

Taking a combination of dividing by 32 and multiplying by 1.6 as an example, specifically, assuming there is a coordinate point $(x_0, y_0)$, then a coordinate point $(x_1, y_1)$ mapped into a drawing window may be obtained through a coordinate transformation as follows:

$$\begin{bmatrix} x_1 \\ y_1 \\ 1 \end{bmatrix} = \begin{bmatrix} S_x & R_y & T_x \\ R_x & S_y & T_y \\ 0 & 0 & 1 \end{bmatrix} \begin{bmatrix} x_0 \\ y_0 \\ 1 \end{bmatrix}$$

Thereafter, the coordinate $(x_1, y_1)$ may be divided by 20 in both x and y coordinates into a coordinate value in pixel as follows:

$$\begin{bmatrix} x_P \\ y_P \end{bmatrix} = \begin{bmatrix} \frac{x_1}{20} \\ \frac{y_1}{20} \end{bmatrix} = \begin{bmatrix} \frac{1.6 x_1}{32} \\ \frac{1.6 y_1}{32} \end{bmatrix}$$

The above Equation indicates that a transformed coordinate value multiplied by 1.6 being divided by 32 may result in a error-free coordinate value in pixel. The transformed coordinate value multiplied by 1.6 may be obtained through the following transformation:

$$\begin{bmatrix} x_1 \\ y_1 \\ 1 \end{bmatrix} = \begin{bmatrix} 1.6 S_x & 1.6 R_y & 1.6 T_x \\ 1.6 R_x & 1.6 S_y & 1.6 T_y \\ 0 & 0 & 1 \end{bmatrix} \begin{bmatrix} x_0 \\ y_0 \\ 1 \end{bmatrix}$$

The above Equation indicates that the transformed coordinate value multiplied by 1.6 as required may be obtained through multiplying the scale factors, the twiddle factors and the shift factors of the transformation matrix respectively by 1.6 and then transforming the original coordinate with the matrix multiplied by 1.6. The above Equation also indicates that simply the transformation parameter instead of the original coordinate value is multiplied by 1.6 to thereby reduce a calculation effort.

As can be apparent from the developed transformation Equations, the transformation process is a process of consecutive multiplications and additions, including two multiplications and three additions. Particularly, a multiplication operation refers to a multiplication of a 32-bit integer with a fixed point number in the format of 16.16 and has a product of a fixed point number in the format of 48.16. Since a final transformation result is a 32-bit integer coordinate value, the product has to be shifted. In a RISC processor, a multiplication operation on two 32-bit integers results in a 64-bit integer, and the 64-bit integer is placed in HI and LO registers by placing the upper 32 bits in the HI register and the lower 32 bits in the LO register. Values in the HI and LO registers have to suffer from a shifting operation in order to obtain a 32-bit integer value. Typically, the upper 16 ones of the bits in the HI register are insignificant bits which may be dispensed with, the lower 16 ones of the bits in the LO register are a fractional part to be dispensed with, the lower 16 ones of the bits in the HI register are upper 16 bits of the 32-bit integer coordinate value, and the higher 16 ones of the bits in the LO register are lower 16 bits of the integer coordinate value. Therefore, the 32-bit integer coordinate value may result from the following manipulations on the HI and LO registers:

HI<<16 HI is logically shifted by 16 bits to the left
LO>>16 LO is logically shifted by 16 bits to the right
R=HI|LO a bitwise OR operation is performed on HI and LO to obtain the result As can be apparent, the 32-bit integer coordinate value is result from three bit manipulations. However in the RISC processor, some complex manipulations may be performed with a single user-defined instruction, and the above manipulations may be performed with a UDI instruction, udi8 rs, rt, rd, (imm<<3), of the RISC processor. The UDI instruction is executed as follows:

rd={rs[(31−8*imm):0], rt[31:(31−8*imm+1)]} imm=00, 01,10,11,100

Figure 3:
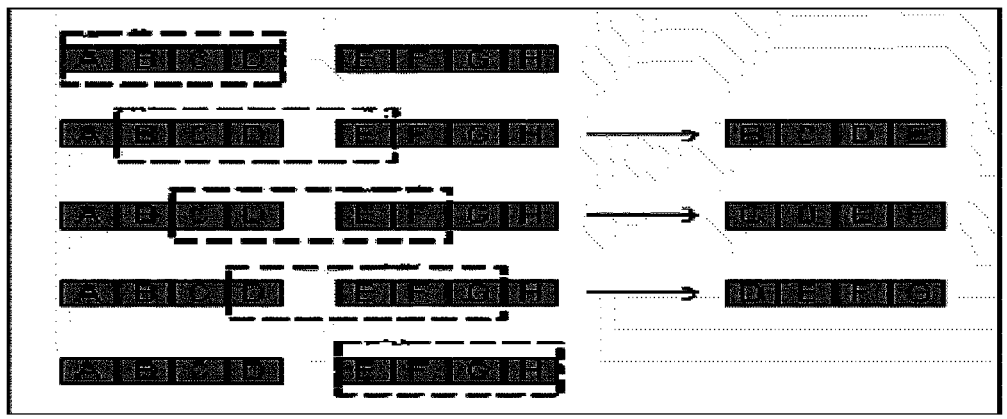
FIG. 3 illustrates a schematic diagram of an operational process of User Defined Instructions (UDI) according to an embodiment of the invention.

In FIG. 3, ABCD represent contents in the register rs, where A=rs[31:24], B=rs[23:16], C=rs[15:8], D=rs[7:0]; EFGH represent contents in the register rt, where: E=rt[31:24], F=rt[23:16], G=rt[15:8], H=rt[7:0]; imm=00 represents ABCD being fetched from the register rs and put sequentially into the register rd; imm=01 represents BCD being fetched from the register rs, E being fetched from the register rt and BCDE being put sequentially into the register rd; imm=10 represents CD being fetched from the register rs, EF being fetched from the register rt and CDEF being put sequentially into the register rd; imm=11 represents D being fetched from the register rs, EFG being fetched from the register rt and DEFG being put sequentially into the register rd; and imm=100 represents EFGH being fetched from the register rt and put sequentially into the register rd. With this instruction, the HI register is taken as the register rs, and the LO register is taken as the register rt, and given imm=10, then the lower 16 ones of the bits in the HI register and the upper 16 ones of the bits in the LO register may be fetched and combined into the 32-bit integer result as required. With the instruction, the above calculation is performed as follows:

udi8 HI,LO,R,(10)<<3

In the embodiment of the invention, the single-cycle instruction, udi8 rs, rt, rd, (imm<<3), in UDIs may be executed to perform an operation in a single instruction instead of originally in three instructions, so as to reduce the number of instructions and also the number of cycles to execute the instructions, thereby accelerating the transformation process.

In the above calculation process, the upper 16 ones of the bits in the HI register may also be significant bits, which indicate that the transformed coordinate value is so large that they exceed a range which can be represented with a 32-bit integer and an overflow occurs. In this case, the overflow needs to be handled typically by assigning an overflow transformation result with 0x7FFFFFFF (overflow) or 0x80000000 (underflow). Whether the result overflows may be determined from whether the upper 16 ones of the bits in the HI register are significant bits. Specifically, when the highest one of the bits in the Hi register is 0, if all the upper 16 ones of the bits therein are 0, then there is no overflow; otherwise, there is an overflow, and the result is assigned with 0x7FFFFFFF; and when the highest one of the bits in the Hi register is 1, if all the upper 16 ones of the bits therein are 1, then there is no underflow; otherwise, there is an underflow, and the result is assigned with 0x80000000.

In the operation 202, the original drawing window is updated into the new drawing coordinate system.

FIG. 4*a* illustrates a position of a polygon relative to a drawing window before the shift factors are multiplied by the transformation parameter, and as illustrated in FIG. 4*b*, the position of the polygon relative to the drawing window is changed after the shift factors of the transformation matrix are multiplied by 1.6, thus resulting in an error in tailoring the polygon. In order to eliminate the tailor error, the drawing window is also updated correspondingly in an embodiment of the invention by transforming coordinates of four vertexes of the drawing window into those expressed in 1/20 pixel and then transforming each of the coordinate by using the following matrix:

$$\begin{bmatrix} 1.6 & 0 & 0 \\ 0 & 1.6 & 0 \\ 0 & 0 & 1 \end{bmatrix}$$

Thus the polygon is tailored in the updated drawing window to eliminate any tailor error.

The operation 203 will be detailed below.

After vertex coordinates are transformed, the polygon is mapped into the new drawing coordinate system. There are three positional relationships between the polygon and the new drawing window: the polygon is in the new drawing window, the polygon intersects the new drawing window, and the polygon is outside the new drawing window. For the polygon in the new drawing window, all the edges of the polygon are valid and thus they are valid boundaries of an area to be filled, in this case, no tailoring process is needed; for the polygon outside the new drawing window, all the edges of the polygon are invalid and thus enclose an area which needs not to be filled, in this case, the polygon is rejected directly without performing any subsequent process; and for the polygon intersecting the new drawing window, a part of the polygon is outside the new drawing window and needs not to be drawn, thus the polygon needs to be tailored with respect to the new drawing window, and in this respect, another part of the polygon in the new drawing window is calculated and then is filled.

Figure 7:
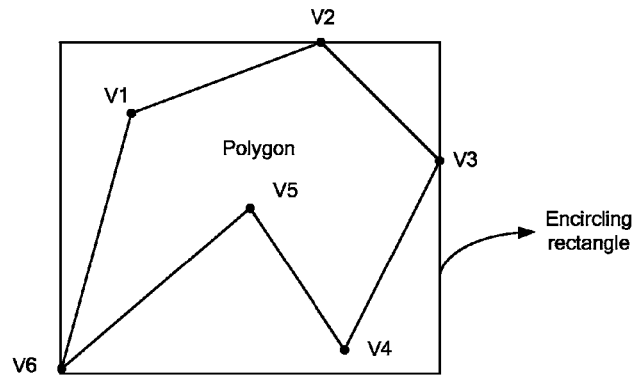
FIG. 7 illustrates a schematic diagram of an encircling rectangle according to an embodiment of the invention.

As illustrated in FIG. 7, an encircling rectangle refers to a smallest rectangle encircling vertexes of a polygon. In order to simplify a calculation process, a positional relationship between a polygon and a drawing window may be determined according to a derived encircling rectangle of the polygon in an embodiment of the invention, and then whether to perform a tailoring process may be determined according to the determined positional relationship, and if no tailoring is needed, then the polygon is acquired directly; otherwise, the polygon is tailored to acquire a part of the polygon in the new drawing window.

Determining whether to tailor the polygon according to the positional relationship between the encircling rectangle and the new drawing window is implemented as follows: when the encircling rectangle is in the new drawing window, it is determined that no tailoring is needed; and when the encircling rectangle intersects a part of the new drawing window, it is determined that the polygon needs to be tailored.

Deriving a encircling rectangle of a polygon is a process of acquiring extremums of x and y coordinates of vertexes. The encircling rectangle may be derived through a way as follows.

(1) Extremums of coordinates of vertexes of the polygon are acquired, i.e., maximum and minimum abscissas and ordinates among the vertex coordinates are acquired.

$x_{min}$=MIN($x_i$)
$y_{min}$=MIN($y_i$)
$x_{max}$=MAX ($x_i$)
$y_{max}$=MAX($y_i$), i=1, . . . , N Where $x_i$ and $y_i$ are vertex coordinates of a polygon, and N is the number of vertexes of the polygon.

(2) The encircling rectangle is delimited with ($x_{min}$, $y_{min}$) and ($x_{max}$, $y_{max}$).

After the encircling rectangle is derived, a positional relationship between the encircling rectangle and the new drawing window may result from a Boolean operation on the encircling rectangle and the rectangle of the new drawing window. The positional relationship is as illustrated in FIGS. 5a, 5b and 5c, where the encircling rectangle does not intersect the new drawing window in FIG. 5a, the encircling rectangle intersects the new drawing window in FIG. 5b, and the encircling rectangle is in the new drawing window in FIG. 5c. In the case where the encircling rectangle does not intersect the new drawing window, the process is terminated; in the case where the encircling rectangle intersects the new drawing window, the polygon needs to be tailored; and in the case where the encircling rectangle is in the new drawing window, scanning and converting may be performed directly while skipping the tailoring process.

In the process, slopes of edges of the polygon are calculated for both tailoring operation and scanning and converting operation. In order to reduce the number of division operations, the slopes of edges of the polygon may be calculated only once to accommodate the use thereof during tailoring and scanning and converting. Therefore, the slopes of edges of the polygon are firstly calculated prior to tailoring and scanning and converting. In order to meet an application requirement, the calculated slopes are processed into fixed point numbers in the format of 16.16. A data structure as shown in Table 1 is filled during calculating the slopes:

TABLE 1

| Edge | $x_1$ | $y_1$ | $x_2$ | $y_2$ | $Slope_x$ |
| --- | --- | --- | --- | --- | --- |

Coordinates ($x_1$, $y_1$) and ($x_2$, $y_2$) of both vertexes of an edge are taken among the transformed coordinates, and then the slope, $Slope_x$, is calculated as follows:

$$Slope_x = \frac{x2 - x1}{y2 - y1}$$

Then $Slope_x$ is processed into a fixed point number in the format of 16.16. When the edge is a horizontal edge, it is unable to calculate $Slope_x$ of the edge, but since the horizontal edge can be eliminated during scanning and converting process because it does not contribute to generation of scan segments during the scanning and converting progress, $Slope_x$ of the horizontal edge may be assigned with a fixed value, e.g., 0x7FFFFFFF, which indicates that this $Slope_x$ is insignificant and is not used for calculation. Finally, each value is written into the data structure for use in a subsequent process.

A polygon may be tailored by acquiring a data structure, Edge, of each edge sequentially in the order of vertexes and then tailoring each edge sequentially with respect to the new drawing window in a tailoring algorithm to thereby resulting in a coordinate of a new vertex. When an edge is completely in the new drawing window, the coordinates of endpoints of the edge after tailoring and the $Slope_x$ keep unchanged. When an edge intersects a boundary of the new drawing window at one or two intersections, ($x_1$, $y_1$) or ($x_2$, $y_2$) is updated correspondingly with a calculated coordinate of the intersection(s) after tailoring under an update rule as illustrated in FIGS. 6a, 6b and 6c while $Slope_x$ keeps unchanged, where (x2, y2) is replaced with the coordinate of an intersection P1 in FIG. 6a, (x1, y1) is replaced with the coordinate of an intersection P1 in FIG. 6b, and (x1, y1) and (x2, y2) are replaced with the coordinates of intersections P1 and P2 respectively in FIG. 6c.

The slope, $Slope_x$, of the edge is used in the tailoring algorithm and acquired directly from the data structure, Edge, for use. After the tailoring process is completed, the data structure, Edge, of each edge is updated so that all the edges of the polygon are in the new drawing window.

The operation 204 will be detailed below.

For a polygon already completely in the new drawing window, a scanning and converting process is thereafter performed to convert the polygon into a set of scan segments on each scan line. The scan line refers to a horizontal line in the drawing window traversing the window, and the total number of scan lines in a drawing window is H, i.e., the height of the drawing window in pixel. The scan segment refers to a part of the scan line in the polygon, and scan segments on a number, H, of scan lines completely cover the polygon. Thus, the polygon is colored by coloring these scan segments.

Figure 8:
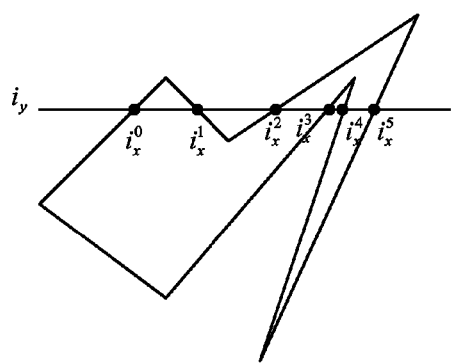
FIG. 8 illustrates a schematic diagram of scanning and converting a polygon according to an embodiment of the invention.

In the scanning and converting process, edge data is acquired from the data structure, Edge, edges intersecting a current scan line are determined sequentially, and intersections of these edges with the scan line are calculated as follows:

$$i_x = x_1 + Slope_x(i_y - y_1)$$

Where $i_x$ is a x coordinate value of a intersection of the scan line with a edge, and $i_y$ is the y coordinate value of the scan line. Since a horizontal edge does not contribute to generation of a scan segment, if an edge acquired from the data structure, Edge, is a horizontal edge, then the scanning and converting progress performed on the horizontal edge is skipped. A calculation process of the scanning and converting is as illustrated in FIG. 8.

After the calculation is completed, the x coordinates of a number, 2m+2 (m is a nonnegative integer), of resulting intersections are ranked in a descending order of the x coordinate value, and then are written into a data structure as shown in Table 2:

TABLE 2

| ScanLine | $i_y$ | $i_x^0$ | $i_x^1$ | ... | $i_x^{2m}$ | $i_x^{2m+1}$ |
|---|---|---|---|---|---|---|

Thus, it can be ensured that scan segments delimited with intersections, e.g., $i_x^0 i_x^1$, $i_x^{2n} i_x^{2n+1}$, etc., cover the inside of the polygon, and scan segments, e.g., $i_x^1 i_x^2$, $i_x^{2n-1} i_x^{2n}$, etc. cover the outside of the polygon, that is, scan segments delimited with even-odd numbered intersections cover the inside of the polygon, and scan segments delimited with odd-even numbered intersections cover the outside of the polygon. The scan segments delimited with the even-odd numbered intersections are colored to thereby ensure proper filling of an area in the polygon. This coloring process is performed on all scan lines to thereby complete the scanning and converting process on the polygon.

It shall be noted that all the existing coordinate data is in 1/20 pixel, and to calculate an intersection, the coordinate y of a scan line also needs to be converted into one in 1/20 pixel, and if the coordinate y of the scan line is y', then the converted coordinate y of the scan line is represented as $i_y$ and $i_y = 20y'$. In order to accelerate the scanning and converting process performed in the new drawing window, the scanning and converting is performed on only those scan lines with ordinates being an integer multiply of $2^n$ in a preferred embodiments of the invention.

This embodiment is implemented as follows:

a link table of scan segments is created;

when the ordinate of a scan line in the new drawing window is an integer multiply of $2^n$, a scan segment corresponding to the scan line is determined, which is a part of the scan line common with the part of the polygon in the new drawing coordinate system in the new drawing window; and parameters of the scan segment are added into the link table of scan segments.

In the present embodiment, the parameters of the segment of the scan line common with the part of the polygon in the new drawing coordinate system in the new drawing window are added into the link table of scan segments. The parameters may include parameters in any combination selected from the group including: a combination of the ordinate $i_y$ of the scan line, the abscissa $i_x^1$ of one endpoint of the scan segment and the abscissa $i_x^r$ of the other endpoint of the scan segment; or a combination of the ordinate $i_y$ of the scan line, the abscissa $i_x^1$ of one of the endpoints with a smaller abscissa of the scan segment and the length of the scan segment; or a combination of the ordinate $i_y$ of the scan line, the abscissa $i_x^r$ of one of the endpoints with a larger abscissa of the scan segment and the length of the scan segment. The parameters used in the embodiment of the invention are parameters in the first combination, i.e., the ordinate $i_y$ of the scan line, the abscissa $i_x^1$ of one endpoint of the scan segment and the abscissa $i_x^r$ of the other endpoint of the scan segment.

The operation 205 will be detailed below. After the scanning and converting process is completed, the scan segments $i_x^{2m} i_x^{2m+1}$ are acquired sequentially from the data structure, ScanLine, where m is a nonnegative integer not larger than n, and pixels covered with each of the scan segments are colored to thereby fill the polygon.

Figure 9:
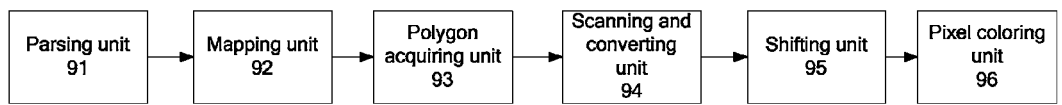
FIG. 9 illustrates a schematic diagram of a structure of a device for processing a vector graph according to an embodiment of the invention.

FIG. 9 illustrates a schematic diagram of a device for processing a vector graph according to an embodiment of the invention, and for a convenient description thereof, only parts thereof relevant to the embodiment of the invention are illustrated. The device may be integrated in a multimedia playing terminal, e.g., a mobile phone, a Personal Digital Assistant (PDA), an MP4, a navigator of a Global Positioning System (GPS), etc., to play multimedia data consisted of vectors, e.g., a FLASH animation file, a GPS image, etc.

Referring to FIG. 9, a device for processing a vector graph according to an embodiment of the invention includes a parsing unit 91, a mapping unit 92, a polygon acquiring unit 93, a scanning and converting unit 94, a shifting unit 95 and a pixel coloring unit 96.

The parsing unit 91 is configured to parse the vector graph into a series of polygons;

The mapping unit 92 is configured to map the polygons into a new drawing coordinate system in $1/2^n$ pixel by a transformation matrix multiplied with a transformation parameter, and to update an original drawing window into the new drawing coordinate system where the transformation parameter is represented as A and $A = 2^n/K$, where n is a shift parameter, vertex coordinates of a polygon are in 1/K pixel, and n and K are natural numbers;

The polygon acquiring unit 93 is configured to acquire, in a new drawing window, a part of each polygon in the new drawing coordinate system;

The scanning and converting unit 94 is configured to convert the part of the polygon in the new drawing coordinate system in the new drawing window into a set of scan segments;

The shifting unit 95 is configured to shifting true forms of coordinates of the scan segments by n bits to the right; and The pixel coloring unit 96 is configured to color pixels on shifted scan segments.

The mapping unit 92 may map the polygons into the new drawing coordinate system in $1/2^n$ pixel by the transformation parameter and the transformation matrix via the following formula:

$$\begin{bmatrix} x' \\ y' \\ 1 \end{bmatrix} = AT \begin{bmatrix} x \\ y \\ 1 \end{bmatrix}$$

Particularly, the transformation matrix is represented as T and $$T = \begin{bmatrix} S_x & R_y & T_x \\ R_x & S_y & T_y \\ 0 & 0 & 1 \end{bmatrix},$$

where $S_x$ is a scale factor in the direction x, $S_y$ is a scale factor in the direction y, $R_x$ is a twiddle factor in the direction x, $R_y$ is a twiddle factor in the direction y, $T_x$ is a shift factor in the direction x, $T_y$ is a shift factor in the direction y, (x, y) is an original coordinate, and (x', y') is a transformed coordinate.

Further, the mapping unit 92 may map the polygons into the new drawing coordinate system in $1/2^n$ pixel by the transformation parameter and the transformation matrix in a single-cycle instruction among UDIs. In the embodiment of the invention, the single-cycle instruction, udi8 rs, rt, rd, (imm<<3), among the UDIs may be executed to perform an operation in a single instruction instead of originally in three instructions so as to reduce the number of instructions and also the number of cycles to execute the instructions, thereby accelerating the transformation process.

The device may further include:
a slope calculation unit configured to calculate a slope of each edge of each of the polygons from vertex coordinates of the polygon in the new drawing coordinate system; and
a memory unit configured to store the slope of each edge of the polygon to be provided for use in a tailoring process and a scanning and converting process.

The polygon acquiring unit 93 includes:
an encircling rectangle acquiring unit configured to acquire an encircling rectangle of each of the polygons; and
a first acquiring unit configured to determine whether to tailor the polygon from a positional relationship between the encircling rectangle and the new drawing window, and to acquire directly the polygon if the polygon is not to be tailored; otherwise, to tailor the polygon to acquire a part of the polygon in the new drawing window.

The first acquiring unit is configured to determine the polygon not to be tailored when the encircling rectangle is in the new drawing window and to determine the polygon to be tailored when the encircling rectangle intersects a part of the new drawing window.

The first acquiring unit is configured to acquire a data structure of each edge sequentially, and to tailor the edge of a corresponding polygon with respect to the new drawing window in a tailoring algorithm, where, coordinates of endpoints of the edge keep unchanged after tailoring when the edge of the polygon is in the new drawing window, and a coordinate of an intersection is calculated after tailoring and coordinate values in the data structure are updated when the edge of the polygon intersects the new drawing window.

The encircling rectangle acquiring unit is configured to acquire extremums among vertex coordinates of the polygon and to delimit the encircling rectangle with maximum and minimum abscissas and ordinates among the vertex coordinates.

The scanning and converting unit 94 is configured to acquire a scan segment corresponding to a scan line in the new drawing window when the ordinate of the scan line is an integer multiply of $2^n$, where, the scan segment is a part of the scan line common with the part of the polygon in the new drawing coordinate system in the new drawing window.

The scanning and converting unit 94 may acquire a scan segment corresponding to a scan line in the new drawing window when the ordinate of the scan line is an integer multiply of $2^n$ in the following specific process:
a link table of scan segments is created;
when the ordinate of a scan line in the new drawing window is an integer multiply of $2^n$, a scan segment corresponding to the scan line are determined, which is a part of the scan line common with the part of the polygon in the new drawing coordinate system in the new drawing window; and
parameters of the scan segment are added into the link table of scan segments.

In the present embodiment, the parameters of each of the segments of the scan line common with the part of the polygon in the new drawing coordinate system in the new drawing window are added into the link table of scan segments. The parameters may include parameters in any combination selected from the group including: a combination of the ordinate $i_y$ of the scan line, the abscissa $i_x^l$ of one endpoint of the scan segment and the abscissa $i_x^r$ of the other endpoint of the scan segment; or a combination of the ordinate $i_y$ of the scan line, the abscissa $i_x^l$ of one of the endpoints with a smaller abscissa of the scan segment and the length of the scan segment; or a combination of the ordinate $i_y$ of the scan line, the abscissa $i_x^r$ of one of the endpoints with a larger abscissa of the scan segment and the length of the scan segment. The parameters used in the embodiment of the invention are parameters in the first combination, i.e., the ordinate $i_y$ of the scan line, the abscissa $i_x^l$ of one endpoint of the scan segment and the abscissa $i_x^r$ of the other endpoint of the scan segment.

In the embodiments of the invention, when pixels covered by a scan line are being colored, a division operation is replaced with shifting of coordinate values, and a resulting error of tailoring a polygon is taken into consideration in a calculation process prior to coloring, thereby the number of division operations is reduced on the precondition of ensuring a correct result.

The embodiments of the invention take into full consideration the characteristic of an RISC processor as well as the characteristic and computation association of a FLASH polygon processing, to well accelerate the FLASH polygon processing. Vertex coordinates of a polygon in FLASH are defined per 1/20 pixel, thus after scanning and converting process is completed, and during coloring of scan segments, coordinate values have to be divided by 20 into those expressed in pixel. Here, the operation of dividing by 20 is replaced with shifting by n bits to the right, and an error is taken into consideration in a transformation matrix, thereby ensuring reducing the number of division operations on the precondition of ensuring a correct result.

In an embodiment of the invention, a specific UDI instruction may be executed to convert a result of a multiplication operation on fixed point numbers rapidly into an integer result as required, to thereby reduce the number of instructions required for conversion and accelerate the coordinate transformation process.

In an embodiment of the invention, an encircling rectangle of a polygon is defined and a positional relationship between the encircling rectangle of the polygon and a new drawing window is calculated to decide whether the polygon needs to be tailored, so that only those polygons required to be tailored are tailored, thereby reducing unnecessary calculation. Since calculation of slopes of edges is required in both the tailoring process and the scanning and converting process, the slopes of the edges are calculated in advance for repeated use in the tailoring process and the scanning and converting process, to thereby reduce both the number of times that the slopes are calculated and the number of division operations.

Evidently those skilled in the art may make various modifications and variations to the invention without departing from the scope of the invention. Accordingly, the invention is also intended to encompass these modifications and variations provided these modifications and variations come into the scope of the claims appended to the invention and their equivalents.

The invention claimed is:

1. A method for processing a vector graph, comprising:
   parsing the vector graph into a series of polygons;
   mapping the polygons into a new drawing coordinate system in $1/2^n$ pixel by using a transformation parameter and a transformation matrix, and updating an original drawing window into the new drawing coordinate system, wherein, the transformation parameter is represented by A and $A=2^n/K$, wherein, n is a shift parameter, vertex coordinates of each of the polygons are in $1/K$ pixel, and n and K are natural numbers;
   acquiring, in a new drawing window, a part of each of the polygons in the new drawing coordinate system;
   converting the part of the polygon in the new drawing coordinate system in the new drawing window into a set of scan segments; and
   shifting true forms of coordinates of the scan segments by n bits to the right, and coloring pixels on shifted scan segments.

2. The method of claim 1, wherein, the polygons are mapped into the new drawing coordinate system in $1/2^n$ pixel by the transformation parameter and the transformation matrix via the following formula:

$$\begin{bmatrix} x' \\ y' \\ 1 \end{bmatrix} = AT \begin{bmatrix} x \\ y \\ 1 \end{bmatrix}$$

Wherein, the transformation matrix is represented by T and $$T = \begin{bmatrix} S_x & R_y & T_x \\ R_x & S_y & T_y \\ 0 & 0 & 1 \end{bmatrix},$$

and
wherein, $S_x$ is a scale factor in the direction x, $S_y$ is a scale factor in the direction y, $R_x$ is a twiddle factor in the direction x, $R_y$ is a twiddle factor in the direction y, $T_x$ is a shift factor in the direction x, $T_y$ is a shift factor in the direction y, (x, y) are original coordinates, and (x', y') are transformed coordinates.

3. The method of claim 1, wherein, the polygons are mapped into the new drawing coordinate system in $1/2^n$ pixel by the transformation parameter and the transformation matrix in a single-cycle instruction among user defined instructions.

4. The method of claim 1, further comprising: before acquiring, in the new drawing window, a part of the polygon in the new drawing coordinate system,
   calculating and storing slopes of each edge of the polygon from vertex coordinates of the polygon in the new drawing coordinate system, where, slopes of each edge of the polygon are stored for use in a tailoring process and a scanning and converting progress.

5. The method of claim 1, wherein, acquiring, in the new drawing window, a part of the polygon in the new drawing coordinate system comprises:
   acquiring an encircling rectangle of the polygon; and
   determining whether the polygon needs to be tailored from a positional relationship between the encircling rectangle and the new drawing window, and acquiring directly the polygon if the polygon is not to be tailored; otherwise, tailoring the polygon to acquire a part of the polygon in the new drawing window.

6. The method of claim 5, wherein, determining whether the polygon needs to be tailored from the positional relationship between the encircling rectangle and the new drawing window comprises:
   determining the polygon not be tailored when the encircling rectangle is in the new drawing window and determining the polygon to be tailored when the encircling rectangle intersects a part of the new drawing window.

7. The method of claim 5, wherein, tailoring the polygon comprises:
   acquiring a data structure of each edge of the polygon sequentially, and tailoring the edge with respect to the new drawing window in a tailoring algorithm, wherein, when the edge of the polygon is in the new drawing window, coordinates of endpoints of the edge keep unchanged after tailoring; and when the edge of the polygon intersects the new drawing window, coordinates of an intersection are calculated after tailoring and coordinate values in the data structure are updated.

8. The method of claim 5, wherein, acquiring the encircling rectangle of the polygon comprises:
   acquiring extremums among vertex coordinates of the polygon and delimiting the encircling rectangle with maximum and minimum abscissas and ordinates among the vertex coordinates.

9. The method of claim 1, wherein, converting the part of the polygon in the new drawing coordinate system in the new drawing window into the set of scan segments comprises:
   acquiring a scan segment corresponding to a scan line in the new drawing window when an ordinate of the scan line is an integer multiply of $2^n$, wherein, the scan segment is a part of the scan line common with the part of the polygon in the new drawing coordinate system in the new drawing window.

10. The method of claim 1, wherein, K=20.

11. A device comprising:
    one or more processors configured to:
    to parse a vector graph into a series of polygons;
    map the polygons into a new drawing coordinate system in $1/2^n$ pixel by a transformation matrix multiplied by a transformation parameter, and to update an original drawing window into the new drawing coordinate system, wherein, the transformation parameter is represented by A and $A=2^n/K$, and wherein, n is a shift parameter, vertex coordinates of each of the polygons are in $1/K$ pixel, and n and K are natural numbers;

acquire, in a new drawing window, a part of the polygon in the new drawing coordinate system;
convert the part of the polygon in the new drawing coordinate system in the new drawing window into a set of scan segments;
shift true forms of coordinates of the scan segments by n bits to the right; and
color pixels on shifted scan segments.

12. The device of claim 11, wherein the one or more processors are configured to map the polygons into the new drawing coordinate system in $1/2^n$ pixel by the transformation parameter and the transformation matrix via the following formula:

$$\begin{bmatrix} x' \\ y' \\ 1 \end{bmatrix} = AT \begin{bmatrix} x \\ y \\ 1 \end{bmatrix}$$

wherein, the transformation matrix is represented by T and $$T = \begin{bmatrix} S_x & R_y & T_x \\ R_x & S_y & T_y \\ 0 & 0 & 1 \end{bmatrix},$$

and wherein, $S_x$ is a scale factor in the direction x, $S_y$ is a scale factor in the direction y, $R_x$ is a twiddle factor in the direction x, $R_y$ is a twiddle factor in the direction y, $T_x$ is a shift factor in the direction x, $T_y$ is a shift factor in the direction y, (x, y) are original coordinates, and (x', y') are transformed coordinates.

13. The device of claim 11, wherein the one or more processors are configured to map the polygons into the new drawing coordinate system in $1/2^n$ pixel by the transformation parameter and the transformation matrix in a single-cycle instruction among user defined instructions.

14. The device according to claim 11, wherein the one or more processors are configured to:
calculate a slope of each edge of each of the polygons from vertex coordinates of the polygon in the new drawing coordinate system; and
store the slope of the edge of the polygon to be provided for use in a tailoring process and a scanning and converting process.

15. The device of claim 11, wherein the one or more processors are configured to
acquire an encircling rectangle of the polygon; and
determine whether the polygon needs to be tailored from a positional relationship between the encircling rectangle and the new drawing window and to acquire directly the polygon if the polygon is not to be tailored; otherwise, to tailor the polygon to acquire a part of the polygon in the new drawing window.

16. The device of claim 15, wherein the one or more processors are configured to determine the polygon not be tailored when the encircling rectangle is in the new drawing window and to determine the polygon to be tailored when the encircling rectangle intersects a part of the new drawing window.

17. The device of claim 15, wherein the one or more processors are configured to acquire a data structure of each edge of the polygon sequentially, and to tailor the edge with respect to the new drawing window in a tailoring algorithm, wherein, when the edge of the polygon is in the new drawing window, coordinates of endpoints of the edge keep unchanged after tailoring; and when the edge of the polygon intersects the new drawing window, coordinates of an intersection are calculated after tailoring and coordinate values in the data structure are updated.

18. The device of claim 15, wherein the one or more processors are configured to acquire extremums among vertex coordinates of the polygon and to delimit the encircling rectangle with maximum and minimum abscissas and ordinates among the vertex coordinates.

19. The device of claim 11, wherein the one or more processors are configured to acquire a scan segment corresponding to a scan line in the new drawing window when an ordinate of the scan line is an integer multiply of $2^n$, wherein, the scan segment is a part of the scan line common with the part of the polygon in the new drawing coordinate system in the new drawing window.

* * * * *